(12) United States Patent
Hu et al.

(10) Patent No.: US 10,740,114 B2
(45) Date of Patent: Aug. 11, 2020

(54) COMPONENT INVOKING METHOD AND APPARATUS, AND COMPONENT DATA PROCESSING METHOD AND APPARATUS

(71) Applicant: TENCENT TECHNOLOGY (SHENZHEN) COMPANY LIMITED, Shenzhen (CN)

(72) Inventors: Haojun Hu, Shenzhen (CN); Qingjie Lin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 30 days.

(21) Appl. No.: 16/208,132

(22) Filed: Dec. 3, 2018

(65) Prior Publication Data

US 2019/0102201 A1 Apr. 4, 2019

Related U.S. Application Data

(63) Continuation of application No. PCT/CN2017/105662, filed on Oct. 11, 2017.

(30) Foreign Application Priority Data

Oct. 18, 2016 (CN) .......................... 2016 1 0912893

(51) Int. Cl.
*G06F 3/00* (2006.01)
*G06F 9/448* (2018.01)
(Continued)

(52) U.S. Cl.
CPC ............ *G06F 9/449* (2018.02); *G06F 9/4843* (2013.01); *G06F 9/541* (2013.01); *G06F 9/545* (2013.01); *G06F 8/41* (2013.01)

(58) Field of Classification Search
CPC ....................................................... G06F 9/541
(Continued)

(56) References Cited

U.S. PATENT DOCUMENTS

| 5,613,090 A | * | 3/1997 | Willems | G06F 9/452 |
| | | | | 719/329 |
| 8,752,006 B1 | * | 6/2014 | Tolle | G06F 8/30 |
| | | | | 717/106 |

(Continued)

FOREIGN PATENT DOCUMENTS

| CN | 103309660 A | 9/2013 |
| CN | 103618699 A | 3/2014 |

(Continued)

OTHER PUBLICATIONS

Josep Batalle Oronich, Experimentation on Virtualized Routing Function Migration Using OpenFlow. (Year: 2013).*

(Continued)

*Primary Examiner* — Lechi Truong
(74) *Attorney, Agent, or Firm* — Anova Law Group, PLLC

(57) ABSTRACT

A component invoking method includes obtaining component invoking data corresponding to a child application. The component invoking data includes a component identifier identifying a first native component in a parent application and corresponding to a current system platform and a second native component running on another system platform and having a same function as the first native component. The method further includes transferring the component invoking data to a native layer corresponding to the parent application using a communications channel corresponding to the current system platform and invoking the first native component by the native layer based on the component invoking data.

17 Claims, 9 Drawing Sheets

(51) Int. Cl.
*G06F 9/54* (2006.01)
*G06F 9/48* (2006.01)
*G06F 8/41* (2018.01)

(58) Field of Classification Search
USPC ........................................................ 719/328
See application file for complete search history.

(56) References Cited

U.S. PATENT DOCUMENTS

| | | | |
|---|---|---|---|
| 2005/0193366 A1 | 9/2005 | Boland et al. | |
| 2009/0031325 A1* | 1/2009 | Archer | G06F 9/544 |
| | | | 719/315 |
| 2009/0193132 A1* | 7/2009 | Plewnia | G06F 9/5027 |
| | | | 709/230 |
| 2012/0072927 A1* | 3/2012 | Faust | G06F 9/4862 |
| | | | 719/330 |
| 2013/0055292 A1* | 2/2013 | Pierson | G06F 9/542 |
| | | | 719/328 |
| 2017/0041213 A1* | 2/2017 | Nadalin | H04W 36/30 |

FOREIGN PATENT DOCUMENTS

| | | |
|---|---|---|
| CN | 104239071 A | 12/2014 |
| CN | 104350464 A | 2/2015 |
| CN | 104426967 A | 3/2015 |
| CN | 105468369 A | 4/2016 |
| CN | 105607895 A | 5/2016 |

OTHER PUBLICATIONS

The State Intellectual Property Office of the People's Republic of China (SIPO) Office Action 1 for 201610912893.6 dated Feb. 22, 2019 13 Pages (including translation).

The World Intellectual Property Organization (WIPO) International Search Report for PCT/CN2017/105662 dated Jan. 15, 2018 6 Pages (including transltion).

* cited by examiner

US 10,740,114 B2

COMPONENT INVOKING METHOD AND APPARATUS, AND COMPONENT DATA PROCESSING METHOD AND APPARATUS

CROSS-REFERENCE TO RELATED APPLICATIONS

This application is a continuation of International Application No. PCT/CN2017/105662, filed on Oct. 11, 2017, which claims priority to Chinese Patent Application No. 201610912893.6, filed with the Chinese Patent Office on Oct. 18, 2016, and entitled "COMPONENT INVOKING METHOD AND APPARATUS, AND COMPONENT DATA PROCESSING METHOD AND APPARATUS," the entire contents of both of which are incorporated herein by reference.

FIELD OF THE TECHNOLOGY

The present disclosure relates to the field of computer technologies, and in particular, to a component invoking method and apparatus, and a component data processing method and apparatus.

BACKGROUND OF THE DISCLOSURE

With the development of computer technologies and terminals, application requirements based on various types of terminals gradually increase accordingly. Types of operating systems of the terminals vary, including an Android operating system, a Symbian operating system, a Windows mobile operating system, an iPhone OS operating system, a Windows operating system, and/or the like.

A component is a programmable unit that is self-contained and reusable, and has a particular function. A complete application usually needs to invoke different components to implement corresponding functions. Existing applications generate components and invoking components by using development tools and languages correspondingly supported by different operating system platforms. Each application needs to form a set of complete code data corresponding to a system. This occupies large storage space and has large development difficulty.

SUMMARY

In accordance with the disclosure, there is provided a component invoking method including obtaining component invoking data corresponding to a child application. The component invoking data includes a component identifier identifying a first native component in a parent application and corresponding to a current system platform and a second native component running on another system platform and having a same function as the first native component. The method further includes transferring the component invoking data to a native layer corresponding to the parent application using a communications channel corresponding to the current system platform and invoking the first native component by the native layer based on the component invoking data.

Also in accordance with the disclosure, there is provided a component invoking apparatus including one or more processors and one or more non-volatile storage media storing one or more computer readable instructions that, when executed by the one or more processors, cause the one or more processors to, individually or collectively, obtain component invoking data corresponding to a child application. The component invoking data includes a component identifier identifying a first native component in a parent application and corresponding to a current system platform and a second native component running on another system platform and having a same function as the first native component. The one or more instructions further cause the one or more processors to, individually or collectively, transfer the component invoking data to the native layer corresponding to the parent application using a communications channel corresponding to the current system platform and instruct the native layer to invoke the first native component based on the component invoking data.

Also in accordance with the disclosure, there is provided a non-volatile computer readable storage medium storing a computer readable instruction that, when executed by at least one processor, causes the at least one processor to obtain component invoking data corresponding to a child application. The component invoking data includes a component identifier identifying a first native component in a parent application and corresponding to a current system platform and a second native component running on another system platform and having a same function as the first native component. The instruction further causes the at least one processor to transfer the component invoking data to the native layer corresponding to the parent application using a communications channel corresponding to the current system platform and instruct the native layer to invoke the first native component based on the component invoking data.

DESCRIPTION OF EMBODIMENTS

Figure 1:
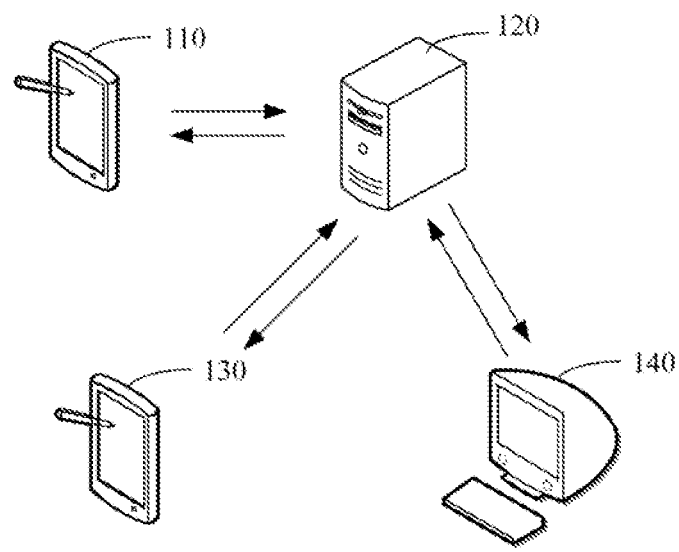
FIG. 1 is a diagram of an application environment of a component invoking method and a component data processing method according to an embodiment.

FIG. 1 is a diagram of an application environment of performing a component invoking method and a component data processing method according to an embodiment. As shown in FIG. 1, the application environment includes a first terminal 110, a server 120, a second terminal 130, and a third terminal 140. The first terminal 110, the server 120, the second terminal 130, and the third terminal 140 communicate with each other by using a network. A quantity of the terminal and a quantity of the server are not limited, and the server 120 may alternatively be a server cluster. The first terminal 110, the second terminal 130, and the third terminal 140 may be smartphones, tablet computers, notebook computers, desktop computers, or the like, but are not limited thereto. Any of the first terminal 110, the second terminal 130, and the third terminal 140 may send a request to the server 120 by using the network, and the server 120 may return corresponding data in response to the request.

The first terminal 110 runs a first operating system. The second terminal 130 runs a second operating system. The third terminal 140 is configured to: edit code data corresponding to a child application and a parent application, implement a first parent application data packet corresponding to a first system platform of the first terminal 110, a second parent application data packet corresponding to a second system platform of the second terminal 130, and component invoking data shared by multiple system platforms, and send the first parent application data packet, the second parent application data packet, and the component invoking data to the server 120. The third terminal 140 may include multiple different terminals. The server 120 receives a downloading request from the first terminal 110 and the second terminal 130, sends the first parent application data packet and the component invoking data to the first terminal 110, and sends the second parent application data packet and the component invoking data to the second terminal 130. The first terminal 110 transfers the component invoking data to a native layer by using a first communications channel to invoke a first native component in the first parent application data packet. The second terminal 130 transfers the component invoking data to the native layer by using a second communications channel to invoke a second native component in the second parent application data packet. Therefore, different native components may be invoked on different system platforms by using same component invoking data, and the child application is published on different platforms by using a set of development data. This reduces resource occupation of the terminal, is easy and convenient, and improves development efficiency.

Figure 2:
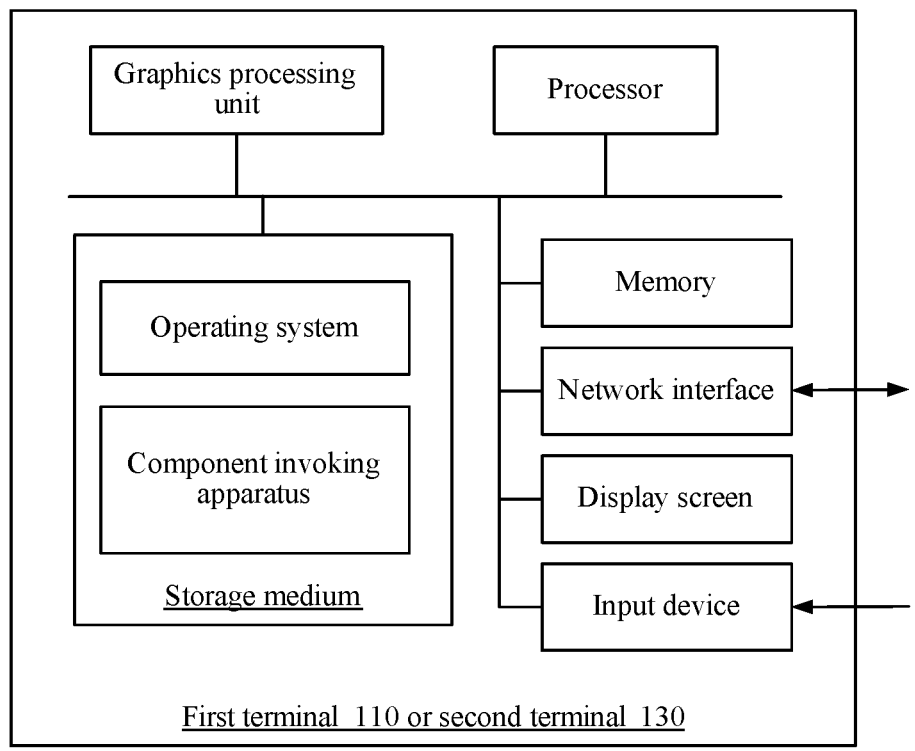
FIG. 2 is a diagram of an internal structure of a terminal 110 or a second terminal 130 in FIG. 1 according to an embodiment.

In an embodiment, an internal structure of the first terminal 110 or the second terminal 130 in FIG. 1 is shown in FIG. 2. The first terminal 110 or the second terminal 130 includes a processor, a graphics processing unit, a storage medium, a memory, a network interface, a display screen, and an input device that are connected to each other by using a system bus. The storage medium of the first terminal 110 or the second terminal 130 stores an operating system and further includes a component invoking apparatus. The apparatus is configured to implement a component invoking method applied to a terminal. The processor is configured to provide computing and control capabilities, to support running of the entire first terminal 110 or second terminal 130. The graphics processing unit in the first terminal 110 or the second terminal 130 is configured to provide at least a capability of drawing a display interface, for example, drawing a component in a page of a child application. The memory provides an environment for running of the component invoking apparatus in the storage medium. The network interface is configured to perform network communication with the server 120, for example, to send a downloading request to the server 120 and receive component invoking data. The display screen is configured to display an application interface and/or the like. The input device is configured to receive a command, data, or the like entered by a user. For the first terminal 110 or the second terminal 130 with a touchscreen, the display screen and the input device may be touchscreens. The structure shown in FIG. 2 is only a block diagram of a partial structure related to a solution in this application, and does not constitute a limit to the terminal to which the solution in this application is applied. In some embodiments, the terminal may include more components or fewer components than those shown in the figure, or some components may be combined, or a different component deployment may be used.

Figure 3:
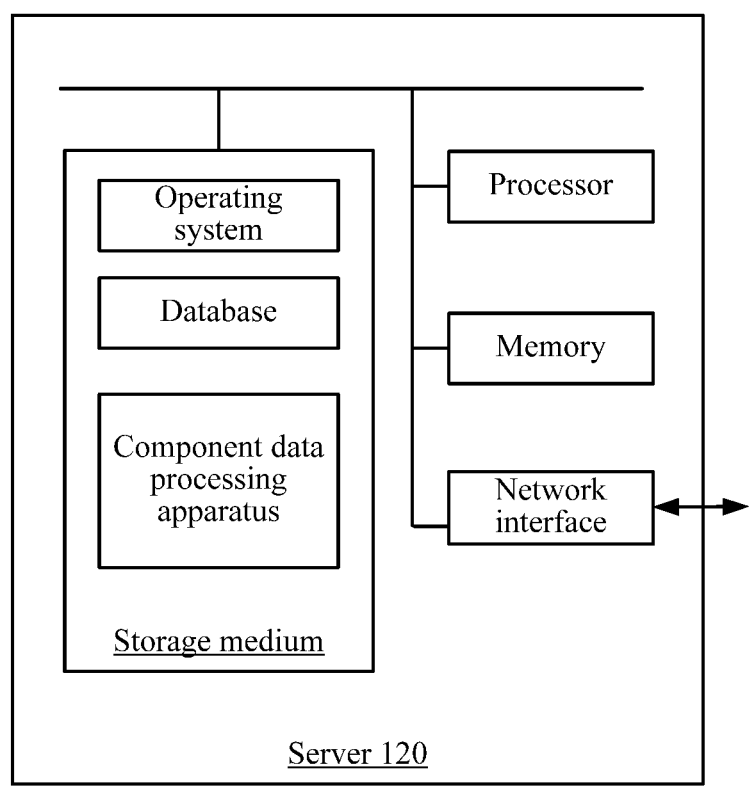
FIG. 3 is a diagram of an internal structure of a server 120 in FIG. 1 according to an embodiment.

In an embodiment, an internal structure of the server 120 in FIG. 1 is shown in FIG. 3, and the server 120 includes a processor, a storage medium, a memory, and a network interface that are connected by using a system bus. The storage medium of the server 120 stores an operating system, a database, and a component data processing apparatus. The database is configured to store data, for example, a parent application data packet and component invoking data. The apparatus is configured to implement a component data processing method applied to the server 120. The processor of the server 120 is configured to provide calculating and control capabilities, to support running of the entire server 120. The memory of the server 120 provides an environment for running of a service test apparatus in the storage medium. The network interface of the server 120 is configured to connect to and communicate with the first terminal 110, the second terminal 130, and the third terminal 140 by using a network, for example, to send the component invoking data or the like to the first terminal 110 and the second terminal 130. The structure shown in FIG. 3 is only a block diagram of a partial structure related to a solution in this application, and does not constitute a limit to the server to which the solution in this application is applied. Specifically, the server may include more components or fewer components than those shown in the figure, or some components may be combined, or a different component deployment may be used.

Figure 4:
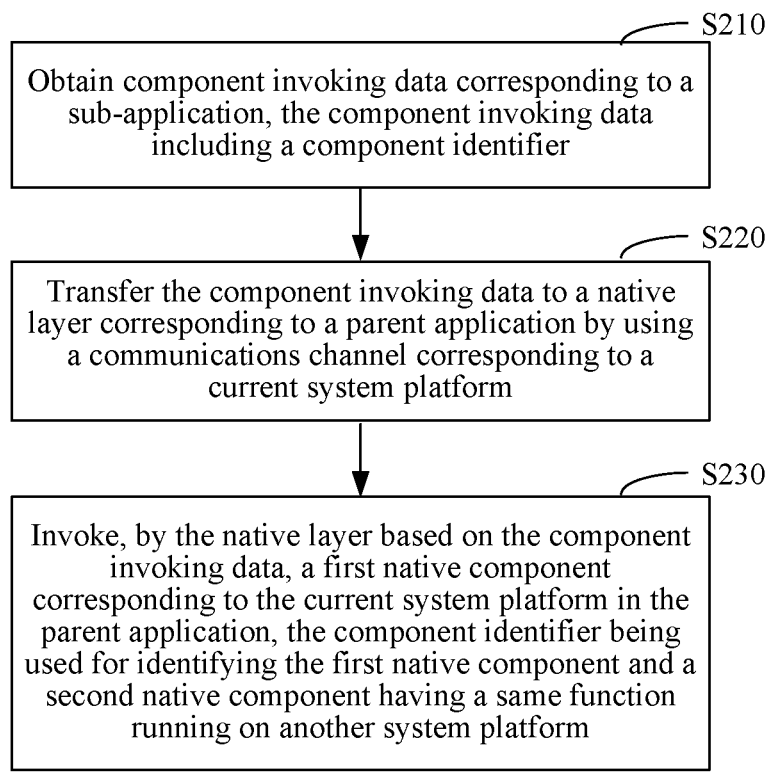
FIG. 4 is a flowchart of a component invoking method according to an embodiment.

FIG. 4 is a flowchart of a component invoking method according to an embodiment. The method can be implemented, for example, in the first terminal 110 in FIG. 1, and is described in more detail below.

S210: Obtain component invoking data corresponding to a child application. The component invoking data includes a component identifier.

In some embodiments, the child application is an application program running by depending on a parent application, and may be downloaded, enabled, run, or disabled through the parent application. The parent application may be a social application, a dedicated application specially supporting the child application, a file management application, an email application, a game application, or the like. The social application may include an instant messaging application, a social network service (SNS) application, a live application, or the like. The child application is an application implemented in an environment provided by the parent application. The child application may be, for example, a social application, a file management application, an email application, a game application, or the like. The child application may invoke a native component of the parent application by using component invoking data. As such, not every child application needs to rewrite a native component. The child application can conveniently invoke the native component of the parent application by obtaining only the component invoking data. A native component refers to a component that is written in a native language and that can directly run on an operating system. A page in the child application that includes different components can be formed by selecting and configuring the native component(s) of the parent application. As such, design and specific implementation of the child application can be easily and conveniently implemented. In an embodiment, there are multiple child applications, and the multiple child applications may share the native component(s) of the parent application, thereby further reducing storage space of the child applications. The component invoking data is data required for invoking the native component of the parent application, and may include a set of labels and component interfaces, including a component identifier, a component attribute, and/or the like. The parent application provides a unified label and component interface for a developer of the child application to write the component invoking data. For example, in some embodiments, the component invoking data can be "<canvas style="width: 300px; height: 200px;" canvas-id="firstCanvas"></canvas>" and may be used for invoking a canvas having a width of 300 PX and a height of 200 PX and of which a component identifier canvas-id is firstCanvas. The component identifier is used for uniquely identify a component. A corresponding target component is found in the native component of the parent application by using the component identifier.

S220: Transfer the component invoking data to a native layer corresponding to a parent application using a communications channel corresponding to a current system platform.

The component invoking data and the native layer are usually implemented by using different languages. Therefore, to implement communication between different languages, the communications channel needs to be used to perform interaction between the component invoking data and the native layer. The communications channel is used for parsing the component invoking data as data that can be identified by the native layer, and provides an execution environment for the component invoking data. Because the native layer identifies only data that is written in a JavaScript language, if being data of another language, the component invoking data needs to be converted into JavaScript scripting language data. The communications channel may be a customized communication rule that enables the component invoking data to identify the native layer and to communicate with the native layer. For example, the communication rule includes a module that converts the component invoking data from another language into JavaScript language data. To expand an application scope of the communications channel for component invoking data written in different languages, the communications channel may also provide a communications channel for a system platform. Different operating systems may correspond to different communications channels. A native layer refers to an application program written in a native language. The native language can be a specific language of a system platform such as an iOS system platform or an android system platform. For example, the iOS system platform supports Xcode and Objective-C (an object-oriented programming language extended to C), and the android system platform supports Eclipse and Java. A native application program may have the best running performance. When transferring the component invoking data, the communications channel may first encode the component invoking data to convert it into a preset format and then perform transferring. After receiving the component invoking data in the preset format, the native layer may decode the component invoking data in the preset format to obtain actual component invoking data.

In an embodiment, the communications channel includes a communication rule provided by the system platform for stipulating interaction between JavaScript scripting language data and the native layer.

Consistent with the disclosure, directly using the communications channel provided by the system platform may allow a function provided by the native layer be conveniently invoked by using the JavaScript scripting language data. As long as the component invoking data is converted into the JavaScript scripting language data, it can be identified by the native layer using the communications channel without the need to customize a communication rule. For an iOS operating system, the communications channel provided by the system platform includes javascriptCore, and for an android operating system, the communications channel provided by the system platform includes webview.

S230: Invoke, by the native layer based on the component invoking data, a first native component corresponding to the current system platform in the parent application. The component identifier is used for identifying the first native component and a second native component having a same function running on another system platform.

Figure 5:
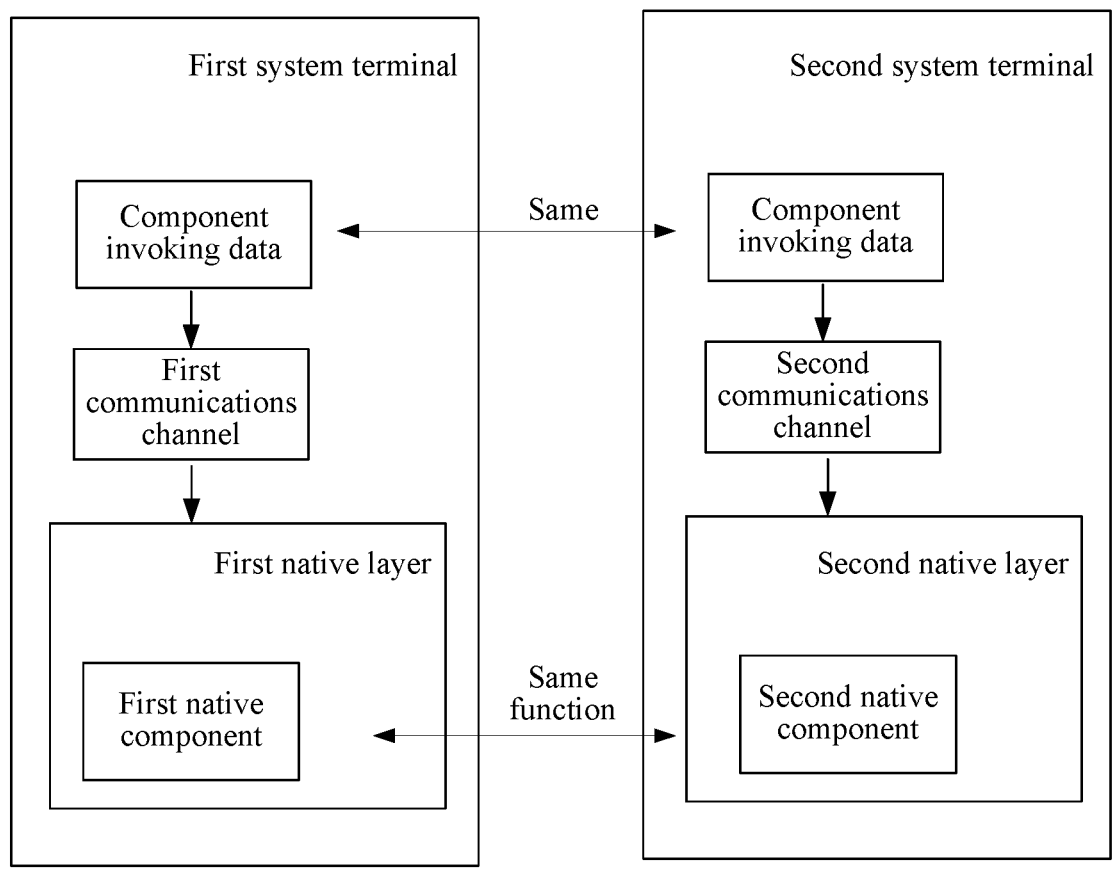
FIG. 5 is a schematic diagram of invoking of terminal components of different system platforms according to an embodiment.

Consistent with the disclosure, because the component invoking data describes a component that needs to be invoked and attribute data of the component, the native layer may obtain the first native component corresponding to the current system platform based on the component identifier, and invoke the first native component by drawing the first native component in a page of the child application based on the attribute data of the component. In addition, the component identifier is not only used for identifying the first native component corresponding to the current system platform, but is also used for identifying the second native component having the same function on another system platform. As shown in FIG. 5, for example, a second system terminal may invoke the second native component by using same component invoking data as the current system terminal. A first system terminal transfers the component invoking data to a first native layer corresponding to a first parent application of the first system terminal by using a first communications channel corresponding to a first system platform, and the second system terminal transfers the component invoking data to a second native layer corresponding to a second parent application of the second system terminal by using a second communications channel corresponding to a second system platform. Because the component invoking data is the same, the second native component having the same function as the first native component corresponding to the second system platform may be invoked. It may be understood that the first parent application and the second parent application may be parent applications implementing a same or different functions. Because a same component identifier may identify different native components having a same function on different system platforms, different native components having the same function on different system platforms may be respectively invoked by using only one piece of component invoking data, and child applications having a same function in a same page may be run on parent applications of different system terminals by using only one piece of component invoking data, thereby implementing cross-platform component invoking. Therefore, a developer needs to write only one piece of component invoking data. This improves development efficiency.

In some embodiments, the component invoking data corresponding to the child application and including the component identifier is obtained, the component invoking data is transferred to the native layer corresponding to the parent application using the communications channel corresponding to the current system platform, and the native layer invokes the first native component corresponding to the current system platform in the parent application based on the component invoking data. The component identifier is used for identifying the first native component and the second native component running on another system platform. As such, the child application may invoke a native component of the parent application by using the component invoking data. Therefore, not every child application needs to rewrite a native component. This saves storage space. In addition, because a same component identifier may identify different native components having a same function on different system platforms, the child application may invoke different native components having a same function on different system platforms with only one piece of component invoking data, thereby implementing cross-platform component invoking. Therefore, the developer needs to write only one piece of component invoking data. This improves development efficiency.

In an embodiment, the component invoking data includes scripting language data generated by compiling initial component invoking data corresponding to a label language.

The label language includes text code that combines text with other information related to the text and that presents a text structure and a data processing detail. The label language has simple syntax and is easy to understand. Hence, the developer needs to write only the initial component invoking data corresponding to the label language, and a compiler disposed on the terminal or a server can compile the initial component invoking data corresponding to the label language to generate the scripting language data. A scripting language includes a programming language and is used for controlling a software application program, for example, a JavaScript scripting language. Because the native layer corresponding to the parent application can only communicate with the scripting language data, it is ensured that the obtained component invoking data is compiled scripting language data. The component invoking data corresponding to the child application does not need to be obtained and compiled again, which further improves component invoking efficiency.

In an embodiment, the method further includes, before obtaining the component invoking data (S210), downloading a first parent application data packet corresponding to the current system platform. The first parent application data packet includes the first native component. A second parent application data packet having a same function as the first parent application data packet exists on another system platform. The second parent application data packet includes the second native component.

A data packet of a parent application refers to complete data supporting running of the parent application, and includes various native components and/or the like for invoking of the parent application and the child application. For different operating system platforms, parent application data packets of different versions are provided, such as a first parent application data packet and a second parent application data packet. The first parent application data packet and the second parent application data packet may implement a same function. Parent application data packets corresponding to different operating system platforms include native components that have a same identifier, complete a same function, and run on different platforms. Terminals of different operating systems may obtain corresponding native components as long as the terminals of different operating systems install parent application data packets corresponding to system platforms of the different operating systems. The native component can implement multiple functions, including a multimedia function, a form function, a life service function, and/or the like, may be invoked by the child application on the parent application, and provides powerful function support for implementation of the child application.

In an embodiment, the method further includes, before obtaining the component invoking data (S210), downloading a data packet corresponding to the child application from a page of the parent application. The data packet includes the component invoking data.

A data packet corresponding to the child application refers to complete data supporting running of the child application, including page configuration data, event data, and/or the like. A component is a basic unit for forming a page. The page configuration data may include the component invoking data. Different native components are drawn in the pages by setting different component invoking data to form different pages. The page of the parent application may provide a download page of the child application, provide a search box for a user to search for an interested child application, and provide information about category search, function abstract description, and/or the like, of the child application. The component invoking data may be associated with page code of the child application. Therefore, for different pages of the child application, components matching the page code are invoked, and component invoking is orderly performed.

In an embodiment, transferring the component invoking data to a native layer (S220) includes the communications channel corresponding to the current system platform serializing the component invoking data to a JSON string and transferring the JSON string to the native layer corresponding to the parent application.

JavaScript Object Notation (JSON) is a lightweight data-interchange format. JSON can convert a set of data represented by a JavaScript object into a string, and then the string can be easily transferred between functions. JSON is a JavaScript native format. Neither special application programming interface (API) nor toolkit is needed when JSON data is processed in JavaScript. The component invoking data is serialized to the JSON string so that the JSON string is conveniently transferred to the native layer corresponding to the parent application.

In some embodiments, invoking the first native component (S230) includes the native layer deserializing the JSON string to component invoking information, obtaining a component invoking position and the component identifier based on the component invoking information, obtaining the first native component corresponding to the component identifier, and drawing the first native component in a page of the child application based on the component invoking position.

In some embodiments, the native layer obtains the component invoking information after deserializing the JSON string, parses the component invoking information to obtain the component invoking position, the component identifier, and component attribute information, such as information about a display size, a display color, and/or the like, obtains the first native component corresponding to the component identifier, and draws the first native component in the page of the child application based on the component invoking position. If the component invoking information includes multiple component identifiers, the native layer respectively obtains multiple corresponding native components based on the component identifiers, and draws the native components in the page of the child application based on specific information about the native components. The native components constitute a layout of the page and an entire page of the child application is generated. A page of the child application may be generated at a time by invoking the native component, or multiple pages of the child application may be generated.

In an embodiment, the first native component includes at least one of a multimedia component, a drawing component, or a map component.

The multimedia component may include an audio and video playing component configured to draw an audio and video playing window and receive audio and video data to play. The drawing component can receive drawing data and draw the drawing data into a line, a function, a curve changing with time, or the like by using an algorithm. The map component can draw a map, receive position information and/or the like, and is configured to draw an icon related to the position on the map, and/or the like. The multimedia component, the drawing component, and the map component can be provided by the parent application without being developed by a developer of the child application. This greatly improves development efficiency, reduces a development period, and reduces storage space of the terminal occupied by each child application. In addition, various components provided by the parent application may be invoked on multiple different system platforms by using only a same piece of component invoking data. This further improves convenience. For example, the parent application can be a social software application and the child application can be a stock selection service application. The component invoking data of the child application invokes the drawing component of the parent application, receives stock data changing in real time, and draws a stock curve in a page of the child application. The server needs to store only a piece of component invoking data of the stock selection service application, so that the server may deliver the component invoking data to different operating system terminals and draw a same stock curve on different operating systems. This greatly increases convenience of generating a service page by the stock selection service application, and improves enthusiasm of an enterprise to construct s service application.

Figure 6:
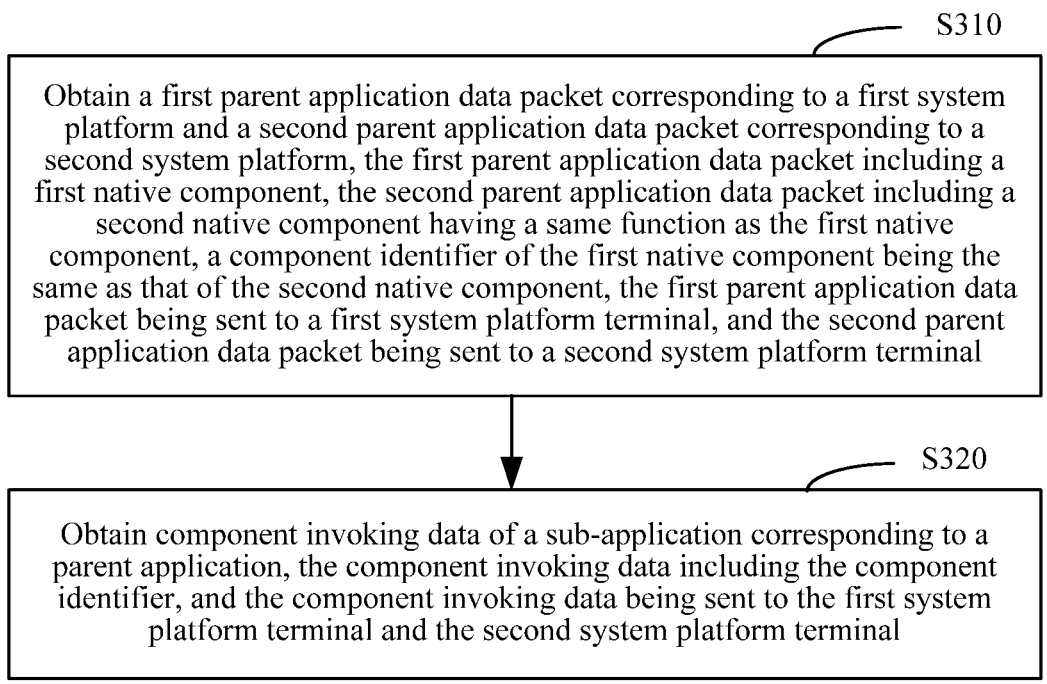
FIG. 6 is a flowchart of a component data processing method according to an embodiment.

FIG. 6 shows a component data processing method consistent with the disclosure. The method shown in FIG. 6 can be implemented, for example, in the server 120 in FIG. 1, and is described in more detail below.

S310: Obtain a first parent application data packet corresponding to a first system platform and a second parent application data packet corresponding to a second system platform. The first parent application data packet includes a first native component. The second parent application data packet includes a second native component having a same function as the first native component. A component identifier of the first native component is the same as the component identifier of the second native component. The first parent application data packet is configured to be sent to a first system platform terminal, and the second parent application data packet is configured to be sent to a second system platform terminal.

A data packet of a parent application refers to complete data supporting running of the parent application, and includes various native components and/or the like for invoking of the parent application and the child application. For different operating system platforms, parent application data packets of different versions are provided. However, parent application data packets corresponding to different operating system platforms include native components that have a same identifier, complete a same function, and run on different platforms. For example, the first parent application data packet includes the first native component, the second parent application data packet includes the second native component having the same function as the first native component, and the component identifier of the first native component is the same as that of the second native component. The first system platform terminal may download the first parent application data packet from the server and install and run the parent application. The second system platform terminal may download the second parent application data packet from the server and install and run the parent application. It may be understood that, the first parent application data packet and the second parent application data packet may be application data packets implementing a same function on different operating systems, or application data packets implementing different functions on different operating systems. Terminals of different operating systems may obtain corresponding native components as long as the terminals of different operating systems install parent application data packets corresponding to system platforms of the different operating systems. The native component implements multiple functions, including a multimedia function, a form function, a life service function, and/or the like, may be invoked by the child application on the parent application, and provide powerful function support for implementation of the child application. The server may receive and save the parent application data packet uploaded by a parent application development terminal.

S320: Obtain component invoking data of a child application corresponding to a parent application, the component invoking data including the component identifier, and the component invoking data being sent to the first system platform terminal and the second system platform terminal. The component invoking data of the child application corresponding to the parent application is also referred to as "target component invoking data."

The child application refers to an application program running by depending on a parent application, and may be downloaded, enabled, run, or disabled by using the parent application. The child application may invoke a native component of the parent application by using component invoking data, so that not every child application needs to rewrite a native component, and the native component of the parent application may be conveniently invoked by obtaining only the component invoking data. A page in the child application that includes different components can be formed by selecting and configuring the native component of the parent application. As such, design and a specific implementation of the child application can be easily and conveniently implemented. The component invoking data may match an application identifier of the child application. For a child application having multiple pages, the component invoking data may also match a page identifier of the child application. Different pages of the child application may match different component invoking data. The first system platform terminal and the second system platform terminal may run or implement parent applications having different or same functions, run or implement child applications having different or same functions, and draw a same component on a same or different parent applications and child applications by invoking same component invoking data. A specific storage form of the component invoking data may be customized based on requirement. The server may receive the component invoking data uploaded by each enterprise or individual developing the child application by using different terminals based on a specific implementation of the child application.

Consistent with the disclosure, the first parent application data packet corresponding to the first system platform and the second parent application data packet corresponding to the second system platform are obtained. The first parent application data packet includes a first native component, and the second parent application data packet includes the second native component having the same function as the first native component. The component identifier of the first native component can be the same as the component identifier of the second native component. The first parent application data packet is configured to be sent to the first system platform terminal, and the second parent application data packet is configured to be sent to the second system platform terminal. The component invoking data of the child application corresponding to the parent application is obtained. The component invoking data can include the component identifier, and the component invoking data can be sent to the first system platform terminal and the second system platform terminal. The parent application can include a native component for invoking by the child application, so that not every child application needs to rewrite a native component. This saves storage space. In addition, because a same component identifier may identify different native components having a same function on different system platforms, the child application may invoke different native components having a same function on different system platforms with only one piece of component invoking data, thereby implementing cross-platform component invoking. Therefore, a developer needs to write only one piece of component invoking data. This improves development efficiency.

In an embodiment, obtaining the component invoking data of the child application corresponding to a parent application (S320) includes receiving initial component invoking data that is written in a label language and that corresponds to the child application, and compiling the initial component invoking data to generate scripting language data to obtain target component invoking data.

The label language includes text code that combines text with other information related to the text and that presents a text structure and data processing detail. The label language has simple syntax and is easy to understand. In some embodiments, the server receives corresponding initial component invoking data written by the developer in the label language, and compiles the initial component invoking data corresponding to the label language to generate the scripting language data. A scripting language includes a programming language and is used for controlling a software application program, for example, a JavaScript scripting language. Because the native layer corresponding to the parent application can only communicate with the scripting language data, performing compiling on the server ensures that the obtained component invoking data is compiled scripting language data. The server does not need to obtain and compile the component invoking data corresponding to the child application again, which further improves component invoking efficiency.

In an embodiment, the method further includes: receiving a first parent application downloading request sent by the first system platform terminal, and sending the first parent application data packet corresponding to the first system platform to the first system platform terminal, to enable the first system platform terminal to install the first parent application data packet to run the first parent application; and/or receiving a second parent application downloading request sent by the second system platform terminal, and sending the second parent application data packet corresponding to the second system platform to the second system platform terminal, to enable the second system platform terminal to install the second parent application data packet to run a second parent application.

In some embodiments, the first system platform terminal and the second system platform terminal respectively have the first parent application data packet and the second parent application data packet installed thereon, to implement obtaining of native components of different system platforms and provide an environment and support for running of the child application. If the first parent application data packet and the second parent application data packet implement a same function, the first parent application and the second parent application are parent applications implementing a same function running on different system platforms. If the first parent application data packet and the second parent application data packet implement different functions, the first native component and the second native component having a same function may be respectively invoked by using the first parent application and the second parent application implementing different functions.

In an embodiment, the method further includes: receiving a first request for downloading the component invoking data sent by the first system platform terminal, and sending the component invoking data to the first system platform terminal, to enable the first system platform terminal to transfer the component invoking data by using a first communications channel to a first native layer corresponding to the first parent application run on the first system platform terminal, to allow the first native layer to invoke the first native component based on the component invoking data; and/or receiving a second request for downloading the component invoking data sent by the second system platform terminal, sending the component invoking data to the second system platform terminal, to enable the second system platform terminal to transfer the component invoking data by using a second communications channel to a second native layer corresponding to the second parent application run by the second system platform terminal, to allow the second native layer to invoke the second native component based on the component invoking data.

In some embodiments, when a terminal needs to generate a new child application or a new page of the child application, the terminal may send a component invoking data downloading request to the server to download corresponding component invoking data, invoke a native component of the parent application based on the component invoking data, and display the component in a page. The component invoking data is data required to invoke the native component of the parent application, and may include a set of labels and component interfaces, including a component identifier, a component attribute, and/or the like. For example, in some embodiments, the component invoking data includes "<canvas style="width: 300px; height: 200px;" canvas-id="firstCanvas"></canvas>" and may be used for invoking a canvas having a width of 300 PX and a height of 200 PX and of which a component identifier canvas-id is firstCanvas. The component identifier is used for uniquely identify a component. A corresponding target component is found in the native component of the parent application by using the component identifier. After obtaining same component invoking data, the first system platform terminal and the second system platform terminal transfer the component invoking data to different native layers by using different communications channels, to respectively invoke different native components having a same identifier and implementing a same function.

The communications channel is configured for interaction between the component invoking data and the native layer. The native layer may identify only data written in a JavaScript language. Thus, if the component invoking data includes data of another language, the data needs to be converted into JS scripting language data first. Different operating systems may correspond to different communications channels which are provided by the system platform. A native layer refers to an application program written in a native language. The native language is a specific language of a system platform such as an iOS system platform or an Android system platform. For example, the iOS system platform supports Xcode and Objective-C, and the Android system platform supports Eclipse and Java. A native application program may have the best running performance. When transferring the component invoking data, the communications channel may first encode the component invoking data to convert it into a preset format and then perform transferring. After receiving the component invoking data in the preset format, the native layer may decode the component invoking data in the preset format to obtain actual component invoking data.

Because the component invoking data describes a component that needs to be invoked and attribute data of the component, the first native layer may obtain the first native component corresponding to the first system platform based on the component identifier, and the second native layer may obtain the second native component corresponding to the second system platform based on the component identifier. In addition, the first native layer invokes the first native component by drawing the first native component in a page of a child application run by the first system platform terminal based on the attribute data of the component, and the second native layer invokes the second native component by drawing the second native component in a page of a child application run by the second system platform terminal based on the attribute data of the component. Because the first native component and the second native component identified by a same component identifier have a same function, different native components having a same function on different system platforms may be respectively invoked by using only one piece of component invoking data, and child applications having a same function in a same page may be run on parent applications of different system terminals by using only one piece of component invoking data, thereby implementing cross-platform component invoking. Therefore, a developer needs to write only one piece of component invoking data. This improves development efficiency.

Figure 7:
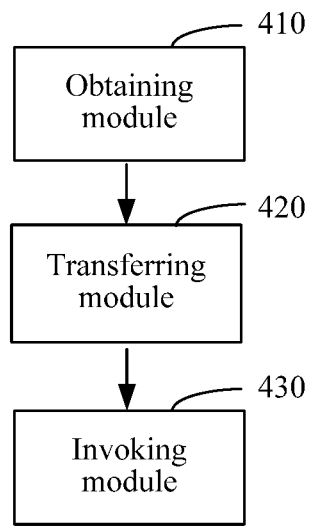
FIG. 7 is a structural block diagram of a component invoking apparatus according to an embodiment.

FIG. 7 shows a component invoking apparatus according to an example embodiment of the disclosure. As shown in FIG. 7, the component invoking apparatus includes an obtaining module 410, a transferring module 420, and an invoking module 430.

The obtaining module 410 is configured to obtain component invoking data corresponding to a child application. The component invoking data includes a component identifier.

The transferring module 420 is configured to transfer the component invoking data to a native layer corresponding to a parent application using a communications channel corresponding to a current system platform.

The invoking module 430 is configured to invoke a first native component corresponding to the current system platform in the parent application through the native layer based on the component invoking data. The component identifier is used for identifying the first native component and a second native component having a same function running on another system platform.

In an embodiment, the component invoking data includes scripting language data generated by compiling initial component invoking data corresponding to a label language.

Figure 8:
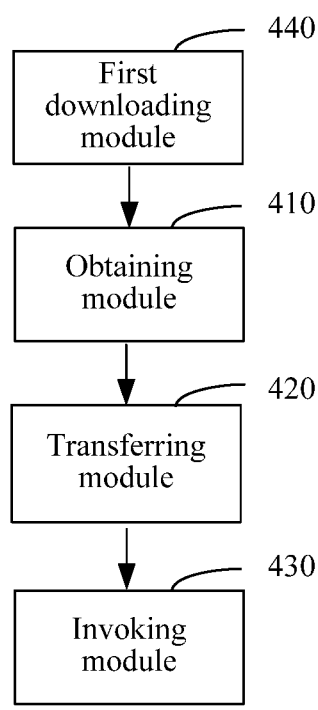
FIG. 8 is a structural block diagram of a component invoking apparatus according to another embodiment.

In an embodiment, as shown in FIG. 8, the apparatus further includes a first downloading module 440 configured to download a first parent application data packet corresponding to the current system platform and a second parent application data packet having a same function as the first parent application data packet existing on another system platform. The first parent application data packet includes the first native component. The second parent application data packet includes the second native component.

Figure 9:
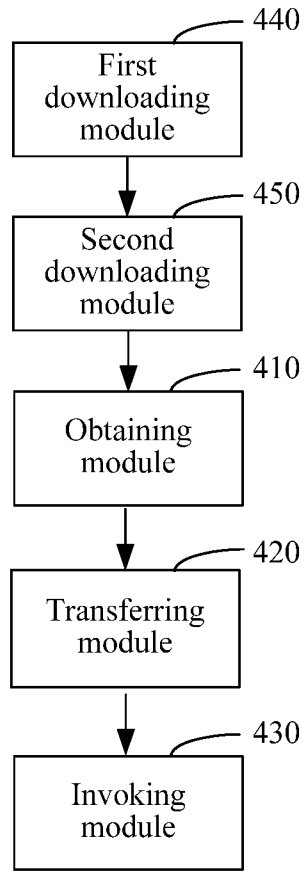
FIG. 9 is a structural block diagram of a component invoking apparatus according to still another embodiment.

In an embodiment, as shown in FIG. 9, the apparatus further includes a second downloading module 450 configure to download a data packet corresponding to the child application from a page of the parent application. The data packet includes the component invoking data.

In an embodiment, the transferring module 420 is further configured to serialize the component invoking data to a JSON string and transfer the JSON string to the native layer corresponding to the parent application through the communications channel corresponding to the current system platform.

Correspondingly, the invoking module 430 is further configured to cause the native layer to deserialize the JSON string to component invoking information, obtain a component invoking position and a component identifier based on the component invoking information, obtain a first native component corresponding to the component identifier, and draw the first native component in a page of the child application based on the component invoking position.

In an embodiment, the first native component includes at least one of a multimedia component, a drawing component, or a map component.

In an embodiment, the communications channel includes a communication rule provided by a system platform for stipulating interaction between JavaScript scripting language data and the native layer.

With reference to the internal structure of the first terminal 110 shown in FIG. 2, in an embodiment, the storage medium of the first terminal 110 may be a non-volatile computer readable storage media, configured to store one or more computer readable instructions, including the obtaining module, the transferring module, and the revoking module. In another embodiment, the computer readable instruction further includes the first downloading module. In another embodiment, the computer readable instruction further includes the second downloading module.

The processor of the first terminal 110 is configured to read the computer readable instruction stored in the storage medium, to implement the component invoking method and functions of the modules of the component invoking apparatus in the foregoing embodiments.

Figure 10:
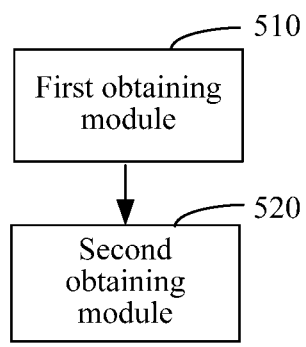
FIG. 10 is a structural block diagram of a component data processing apparatus according to an embodiment.

FIG. 10 shows a component data processing apparatus according to an example embodiment of the disclosure. As shown in FIG. 10, the component data processing apparatus includes a first obtaining module 510 and a second obtaining module 520.

The first obtaining module 510 is configured to obtain a first parent application data packet corresponding to a first system platform and a second parent application data packet corresponding to a second system platform. The first parent application data packet includes a first native component. The second parent application data packet includes a second native component having a same function as the first native component. A component identifier of the first native component is the same as a component identifier of the second native component. The first parent application data packet can be sent to a first system platform terminal and the second parent application data packet can be sent to a second system platform terminal.

The second obtaining module 520 is configured to obtain component invoking data of a child application corresponding to a parent application. The component invoking data includes the component identifier. The component invoking data can be sent to the first system platform terminal and the second system platform terminal.

Figure 11:
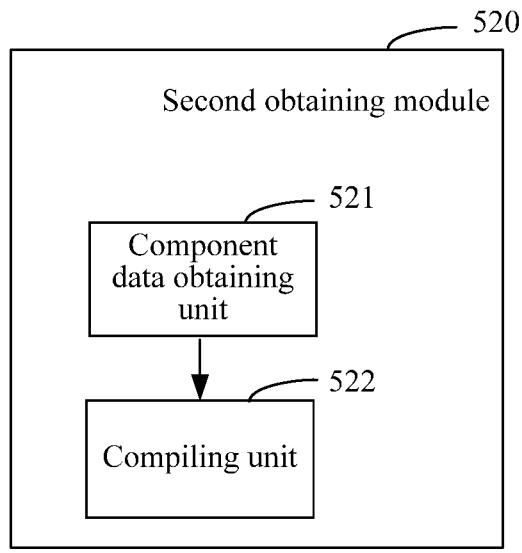
FIG. 11 is a structural block diagram of a second obtaining module according to an embodiment.

In an embodiment, as shown in FIG. 11, the second obtaining module 520 includes a component data obtaining unit 521 configured to receive initial component invoking data that is written in a label language and that is corresponding to the child application, and a compiling unit 522 configured to compile the initial component invoking data to generate scripting language data to obtain target component invoking data.

Figure 12:
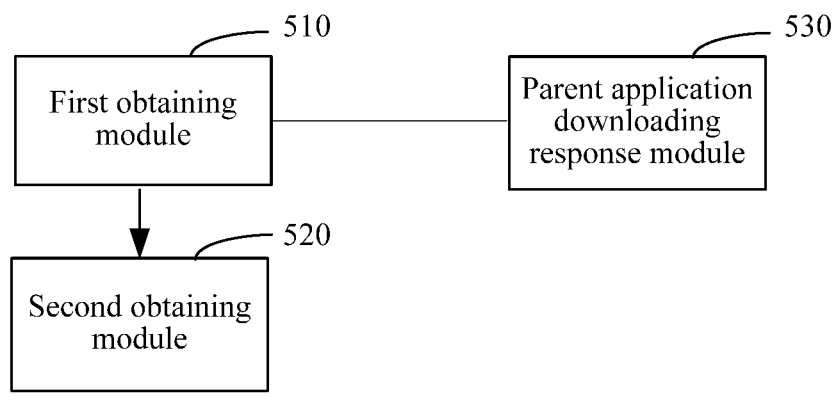
FIG. 12 is a structural block diagram of a component data processing apparatus according to another embodiment.

In an embodiment, as shown in FIG. 12, the apparatus further includes a parent application downloading response module 530. The parent application downloading response module 530 may be configured to receive a first parent application downloading request sent by the first system platform terminal and send the first parent application data packet corresponding to the first system platform to the first system platform terminal, to enable the first system platform terminal to install the first parent application data packet to run the first parent application. Additionally or alternatively, the parent application downloading response module 530 may be configured to receive a second parent application downloading request sent by the second system platform terminal and send the second parent application data packet corresponding to the second system platform to the second system platform terminal, to enable the second system platform terminal to install the second parent application data packet to run a second parent application.

Figure 13:
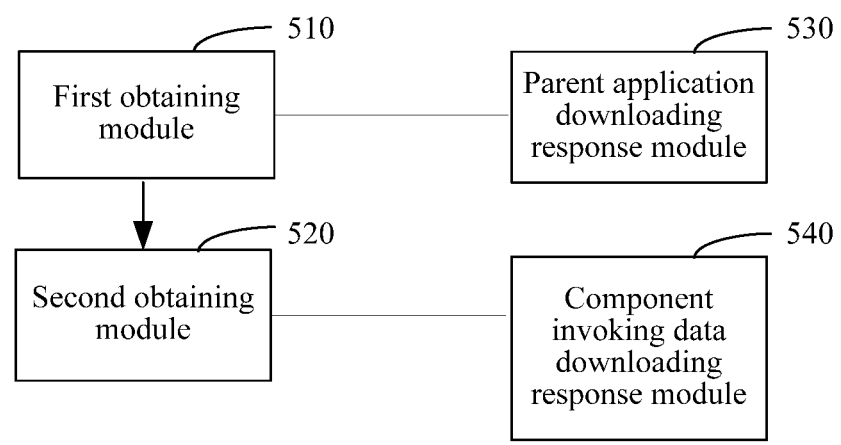
FIG. 13 is a structural block diagram of a component data processing apparatus according to still another embodiment.

In an embodiment, as shown in FIG. 13, the apparatus further includes a component invoking data downloading response module 540. The data downloading response module 540 may be configured to receive a first request for downloading the component invoking data sent by the first system platform terminal and send the component invoking data to the first system platform terminal, to enable the first system platform terminal to transfer the component invoking data by using a first communications channel to a first native layer corresponding to the first parent application run by the first system platform terminal. The first native layer can invoke the first native component based on the component invoking data. Additionally or alternatively, the data downloading response module 540 may be configured to receive a second request for downloading the component invoking data sent by the second system platform terminal and send the component invoking data to the second system platform terminal, to enable the second system platform terminal to transfer the component invoking data by using a second communications channel to a second native layer corresponding to the second parent application run by the second system platform terminal. The second native layer can invoke the second native component based on the component invoking data.

With reference to the internal structure of the server 120 shown in FIG. 3, in an embodiment, the storage medium of the server 120 may be a non-volatile computer readable storage media, configured to store one or more computer readable instructions, including the first obtaining module and the second obtaining module. In another embodiment, the computer readable instruction further includes the parent application downloading response module. In another embodiment, the computer readable instruction further includes the component invoking data downloading response module.

The processor of the server 120 is configured to read the computer readable instruction stored in the storage medium, to implement the steps the component data processing method and functions of the modules of the component data processing apparatus in the foregoing embodiments.

A person of ordinary skill in the art may understand that all or some of the processes in the methods of the foregoing embodiments may be implemented by a computer program instructing relevant hardware. The program may be stored in a computer readable storage medium. For example, in the embodiments of the present disclosure, the program may be stored in a storage medium of a computer system, and is executed by at least one processor in the computer system, to implement the process including the foregoing method embodiments. The storage medium may be a magnetic disk, an optical disc, a read-only memory (ROM), a random access memory (RAM), or the like.

Various technical features in the foregoing embodiments may be randomly combined. For ease of description, not all possible combinations of the various technical features in the foregoing embodiments are described. However, the combinations of the technical features should be considered as falling within the scope recorded in this specification as long as the combinations of the technical features are compatible with each other.

The foregoing embodiments are merely several implementations of the present disclosure, which are described in a relatively specific and detailed manner. However, this should not be constructed as a limitation to the scope of the present disclosure. It should be noted that, a person of ordinary skill in the art may further make various variations and improvements without departing from the conception of the present disclosure, which shall fall within the protection scope of the present disclosure. Therefore, the protection scope of the patent of the present disclosure shall be subject to the appended claims.

What is claimed is:

1. A component invoking method comprising:
 obtaining component invoking data corresponding to a child application, the component invoking data including a component identifier identifying:
 a first native component in a parent application and corresponding to a current system platform; and a second native component corresponding to a second another system platform and having a same function as the first native component;
 transferring the component invoking data to a native layer corresponding to the parent application using a communications channel corresponding to the current system platform, including:
 serializing, by the communications channel corresponding to the current system platform, the component invoking data to a JavaScript Object Notation (JSON) string; and
 transferring the JSON string to the native layer corresponding to the parent application; and
 invoking, by the native layer based on the component invoking data, the first native component, including:

deserializing, by the native layer, the JSON string to component invoking information;
obtaining a component invoking position and the component identifier based on the component invoking information;
obtaining the first native component corresponding to the component identifier;
and drawing the first native component in a page of the child application based on the component invoking position.

2. The method according to claim 1, wherein the component invoking data includes scripting language data generated by compiling initial component invoking data corresponding to a label language.

3. The method according to claim 1, further comprising, before obtaining the component invoking data corresponding to the child application:
downloading a first parent application data packet corresponding to the current system platform, the first parent application data packet including the first native component, wherein a second parent application data packet exists on the second system platform, the second parent application data packet has a same function as the first parent application data packet, and the second parent application data packet comprising includes the second native component.

4. The method according to claim 1, further comprising, before obtaining the component invoking data corresponding to the child application:
downloading, from a page of the parent application, a data packet corresponding to the child application, the data packet including the component invoking data.

5. The method according to claim 1, wherein the first native component comprises at least one of a multimedia component, a drawing component, or a map component.

6. The method according to claim 1, wherein the communications channel includes a communication rule provided by the current system platform for stipulating interaction between JavaScript scripting language data and the native layer.

7. A terminal comprising: one or more processors; and one or more non-volatile storage media storing one or more computer readable instructions that, when executed by the one or more processors, cause the one or more processors to, individually or collectively:
obtain component invoking data corresponding to a child application, the component invoking data including a component identifier identifying:
a first native component in a parent application and corresponding to a current system platform; and
a second native component corresponding to a second system platform and having a same function as the first native component;
transfer the component invoking data to a native layer corresponding to the parent application using a communications channel corresponding to the current system platform, including:
serializing, by the communications channel corresponding to the current system platform, the component invoking data to a JavaScript Object Notation (JSON) string; and
transferring the JSON string to the native layer corresponding to the parent application; and
instruct the native layer to invoke, based on the component invoking data, the first native component, including:
deserializing, by the native layer, the JSON string to component invoking information;
obtaining a component invoking position and the component identifier based on the component invoking information;
obtaining the first native component corresponding to the component identifier; and
drawing the first native component in a page of the child application based on the component invoking position.

8. The terminal according to claim 7, wherein the component invoking data includes scripting language data generated by compiling initial component invoking data corresponding to a label language.

9. The terminal according to claim 7, wherein the one or more computer readable instructions further cause the one or more processors to, individually or collectively: download a first parent application data packet corresponding to the current system platform, the first parent application data packet including the first native component, wherein a second parent application data packet exists on the second system platform, the second parent application data packet having a same function as the first parent application data packet, and the second parent application data packet comprising includes the second native component.

10. The terminal according to claim 7, wherein the one or more computer readable instructions further cause the one or more processors to, individually or collectively, before obtaining the component invoking data: download, from a page of the parent application, a data packet corresponding to the child application, the data packet including the component invoking data.

11. The terminal according to claim 7, wherein the first native component comprises includes at least one of a multimedia component, a drawing component, or a map component.

12. The terminal according to claim 7, wherein the communications channel includes a communication rule provided by the current system platform for stipulating interaction between JavaScript scripting language data and the native layer.

13. Non-transitory computer readable storage medium storing a computer readable instruction that, when executed by at least one processor, causes the at least one processor to:
obtain component invoking data corresponding to a child application, the component invoking data including a component identifier identifying:
a first native component in a parent application and corresponding to a current system platform; and
a second native component corresponding to a second system platform and having a same function as the first native component;
transfer the component invoking data to a native layer corresponding to the parent application using a communications channel corresponding to the current system platform, including:
serializing, by the communications channel corresponding to the current system platform, the component invoking data to a JavaScript Object Notation (JSON) string; and
transferring the JSON string to the native layer corresponding to the parent application; and
instruct the native layer to invoke, based on the component invoking data, the first native component, including:
deserializing, by the native layer, the JSON string to component invoking information;

obtaining a component invoking position and the component identifier based on the component invoking information;

obtaining the first native component corresponding to the component identifier; and drawing the first native component in a page of the child application based on the component invoking position.

14. The storage medium of claim 13, wherein the component invoking data includes scripting language data generated by compiling initial component invoking data corresponding to a label language.

15. The storage medium of claim 13, wherein the instruction further causes the at least one processor to:

download a first parent application data packet corresponding to the current system platform, the first parent application data packet including the first native component, wherein a second parent application data packet exists on the second system platform, the second parent application data packet has a same function as the first parent application data packet, and the second parent application data packet includes the second native component.

16. The storage medium of claim 13, wherein the instruction further causes the at least one processor to:

download, from a page of the parent application, a data packet corresponding to the child application, the data packet including the component invoking data.

17. The storage medium of claim 13, wherein the first native component includes at least one of a multimedia component, a drawing component, or a map component.

* * * * *